United States Patent [19]

Ells

[11] 4,051,687
[45] Oct. 4, 1977

[54] PIPELINE LAYING METHOD

[75] Inventor: John William Ells, Bexleyheath, England

[73] Assignee: The British Petroleum Company Limited, London, England

[21] Appl. No.: 614,238

[22] Filed: Sept. 17, 1975

[30] Foreign Application Priority Data

Sept. 27, 1974 United Kingdom .............. 42188/74

[51] Int. Cl.² .............................................. F16L 1/04
[52] U.S. Cl. ......................................... 61/110; 61/114
[58] Field of Search ...................... 61/72.3, 72.1, 111, 61/107, 114, 110

[56] References Cited

U.S. PATENT DOCUMENTS

| 3,407,611 | 10/1968 | Coultrup | 61/111 |
| 3,431,739 | 3/1969 | Richardson et al. | 61/72.3 |
| 3,482,410 | 12/1969 | Roesky et al. | 61/72.3 |
| 3,524,325 | 8/1970 | Brown | 61/72.3 |
| 3,545,663 | 12/1970 | Bloemhard | 61/72.3 |
| 3,620,028 | 11/1971 | Wilde | 61/72.3 |
| 3,727,417 | 4/1973 | Shaw | 61/72.3 |
| 3,835,656 | 9/1974 | McDermott | 61/72.3 |

Primary Examiner—Paul R. Gilliam
Assistant Examiner—Alex Grosz
Attorney, Agent, or Firm—Morgan, Finnegan, Pine, Foley & Lee

[57] ABSTRACT

The free ends of two pipelines lying on the sea bed are joined by raising both ends to above the surface and supporting them on a barge, bringing them into axial alignment and welding them together by inserting a spool piece if necessary. The welded line is then lowered back to the sea bed and the barge moved sideways.

10 Claims, 14 Drawing Figures

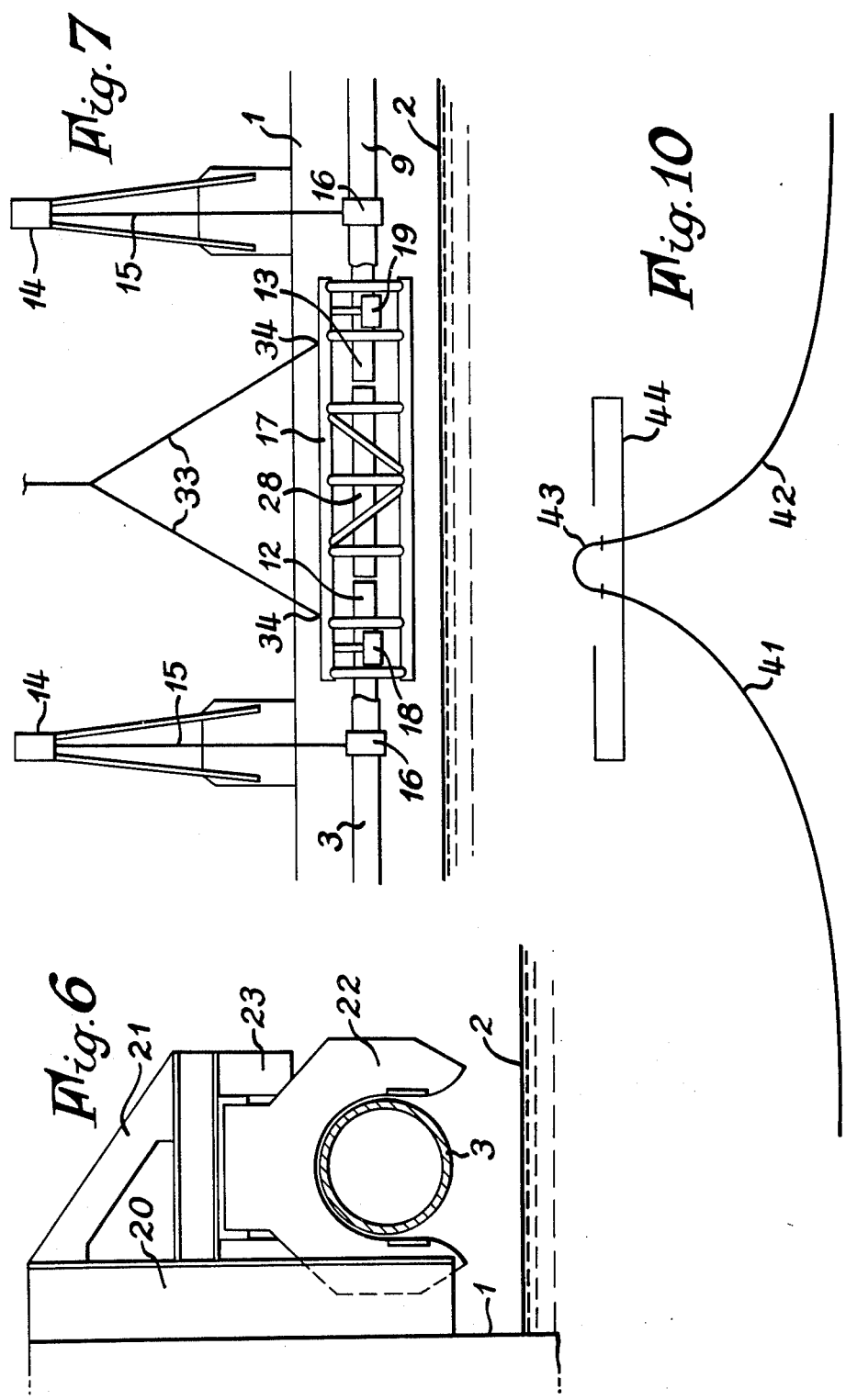

PIPELINE LAYING METHOD

This invention relates to a method of joining the ends of pipelines together at an offshore location when at the commencement of the method the end of at least one of the pipelines is submerged underwater.

For the development of oil and gas deposits at offshore locations, pipelines have been laid from barges to the water bottom. Previously pipelines have been laid as one continuous length but it can be desirable e.g. for the purpose of saving time to lay a pipeline as two or more shorter lengths employing two or more barges simultaneously and leaving the ends of the pipeline lengths to be subsequently joined together.

A problem exists of how to join together the ends of two pipelines, at least one of which is on the water bottom. It is an object of the present invention to provide a solution to this problem.

According to the present invention a method of joining together the ends of two pipelines into one continuous length at an offshore location wherein at the commencement of the method of the ends of the pipelines is submerged below water comprises:-
 a. lifting the submerged end or ends above the water surface, the submerged end or ends being substantially empty of water over the length to be lifted and wherein to assist lifting a buoyancy means is employed
 b. joining the ends of the two pipelines together above the water surface into a continuous length, and
 c. lowering the continuous length of pipeline to the water bottom with lateral movement to accommodate its excess length.

By the term "excess length" is meant the distance by which the length of the joined pipeline is greater than the straight line on the water bottom joining the two points where the pipeline meets the water bottom.

Preferably, prior to the lifting the pipelines are disposed so that when both ends have been lifted above the surface they can be brought into axial alignment, since it is preferred to bring the ends of the pipelines into axial alignment above the surface before joining. If the pipeline contains water in appreciable amounts, then prior to the lifting it is removed e.g. by means of a pipeline sphere or pig or other known means in the art, and the end preferably closed e.g. by means of a cap, to prevent further entry of water.

Preferably the buoyancy means comprises a plurality of buoyancy tanks attached to the pipeline at intervals along the length to be lifted. In a typical instance this length may be from 200 to 2000 feet, more particularly from 500 to 1500 feet.

Preferably the number, size and disposition of the buoyancy tanks are such that the length of pipeline to which they are attached has a buoyancy of about neutral and the portion adjacent the end has some negative buoyancy. The end of the pipeline will thus remain on the sea bed but only a relatively small force will be required to raise it.

Without the buoyancy tanks the pipeline can have a negative buoyancy of from 30 to 150 lbs/foot, preferably from 50 to 100 lbs/foot.

Preferably the lifting is effected by applying substantially vertical forces only to the end or ends to be raised by means of a lifting means.

Preferably the lifting means is a crane on a vessel such as a barge. Preferably the vessel is maintained stationary by anchors or by dynamic positioning.

Although it is preferred to bring the ends of the pipeline lengths into axial alignment, it is possible to join non axially aligned pipe e.g. by means of flanges or bends such as a U shaped bend or other known methods in the art.

Preferably the pipeline ends are joined by welding although other methods such as flanges can be employed.

If any end caps are present on the pipelines it will be necessary to remove them before the joining is effected. This can be done by cutting off the end of the line and the newly formed ends can then be prepared for welding e.g. by bevelling. It is possible to weld the two ends directly together although it may be more convenient to join in a short length of pipe called a spool piece between the two free ends.

After the joining has been completed and the pipeline is lowered to the water bottom the buoyancy tanks can be removed.

The lateral movement can be effected by moving the crane and barge laterally with respect to the line of the pipeline or, alternatively in certain circumstances allowing the pipeline to move laterally under its own forces.

The lateral movement of the pipeline can be effected simultaneously with the lowering of the pipeline. Preferably the lowering and the lateral movement are effected alternately e.g. by starting the lateral movement before the lowering movement, then stopping the lateral movement and lowering the pipeline, stopping the lowering and restarting the lateral movement in a stepwise fashion. When the line has been moved a sufficient distance laterally it will be possible to stop the lateral movement and carry out the lowering to completion. The lateral movement has the effect of taking up the excess length of pipe by a loop in a horizontal plane.

Preferably during the lowering the pipeline is supported by a buoyancy means, more preferably a plurality of buoyancy tanks spaced at intervals along the length thereof, which buoyancy tanks can conveniently be the same buoyancy tanks employed in the lifting.

The lowering is preferably effected by
 i. lowering the pipeline e.g. by means of a davit cable and moving the barge laterally, until the centre thereof reaches the water bottom and the two portions on either side of the centre are supported only by the buoyancy means. At this point the tension in the support means e.g. davit cable becomes zero,
 ii. the buoyancy means are then removed or flooded so that the two portions of pipeline settle onto the water bottom.

According to one embodiment of the invention when, at start of the method, both of the pipelines are submerged, the pipelines are lifted to a position where they are held by force applied upwardly i.e. within 45° of the vertical, preferably substantially vertically. In this position their axes will not be colinear and it will be necessary to join them with an appropriately shaped spool piece e.g. a C or U-shape or rounded V-shape or the like.

The method of the invention can be applied to a wide range of pipeline sizes in a wide range of water depths, for example pipelines whose internal diameter is in the range 10 to 60 inches and water depths up to 1000 feet. Preferably, the inner diameter of the pipeline does not exceed 48 inches and the water depth does not exceed 600 feet. The invention is particularly suitable for pipelines whose internal diameter is from 15 to 40 inches and water depths from 100 to 500 feet.

Preferably before lifting, the pipelines line on the water bottom, their ends being in overlapping relationship, more preferably overlapping to the extent that when both ends are brought into approximate axial alignment on a vessel above the surface they either overlap by a small distance e.g. less than 50 ft. or there is a small gap between their ends e.g. less than 50 feet.

Preferably when the ends of the pipelines have been raised above the surface they are connected to a plurality of relatively small cranes e.g. davits which project from the side of the vessel and pull the pipeline ends up into inverted U or the like shaped brackets.

Preferably a releaseable clamp in a line up frame is used to maintain the ends in alignment and permit welding.

By the term "offshore location" in the present specification we mean to include not only locations at sea but also lake and river locations and the like.

According to one aspect of the invention a method for installing a member in an underwater pipeline which method comprises:
  i. cutting the pipeline on the water bottom
  ii. raising the two ends of the pipeline formed by the cutting to a support above the water surface
  iii. joining the member, and, if necessary, a short length of pipe to the pipeline ends to form a continuous pipeline, and
  iv. lowering the pipeline to the water bottom with lateral movement in such a way as to accommodate its excess length.

The member can be a pipeline manifold or T piece.

The invention is illustrated by reference to the accompanying drawings in which FIGS. 1 to 4 show four pairs of elevations each pair representing a different stage in the method. The left hand sketch of each pair labelled (a) being a side elevation of a lay barge and the pipeline and the right hand sketch of each pair labelled (b) being a front elevation of the lay barge i.e. looking along the line of the two pipelines.

At the commencement of the method both pipelines each of 32 inches internal diameter lie on the sea bed under about 350 feet of water. The pipelines have been dewatered by means of pipeline sphere and the ends capped. Sufficient pipeline has been laid so that they lie side by side and overlap by six or seven joints i.e. about 250 feet. The negative buoyancy of the pipelines is 75 lbs/ft.

FIG. 6 is a front elevation for fixing the ends of the pipelines which is adjustable and capable of being fixed to the side of the vessel and equipped with U shaped supports for contacts with the pipeline ends.

FIG. 7 is a side elevation of a clamp for locking the ends of the pipelines.

FIG. 10 illustrates an alternative method of raising the pipelines to be joined.

Figure 1B:
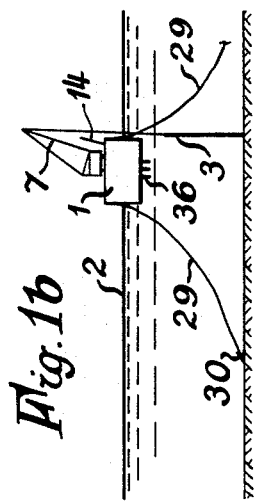
FIGS. 1a and 1b show the stage when one pipeline has been lifted about half way from the sea bed.
Figure 2B:
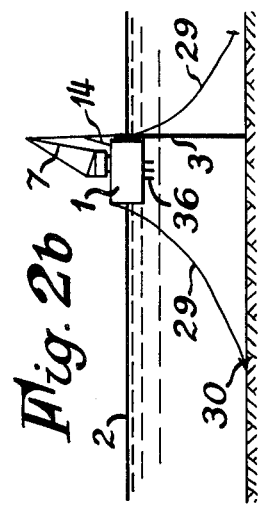
FIGS. 2a and 2b show the stage when the first pipeline has been completely lifted to the barge and held in a line up clamp and the second line has been lifted about half way from the sea bed.
Figure 3B:
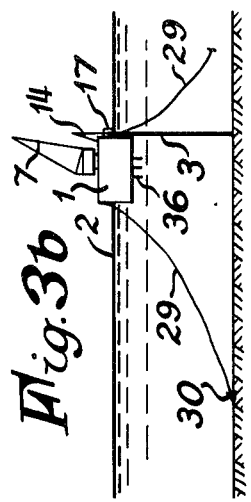
FIGS. 3a and 3b show the two pipelines held in line up clamps and a spool piece welded in to make a continuous line.
Figure 1A:
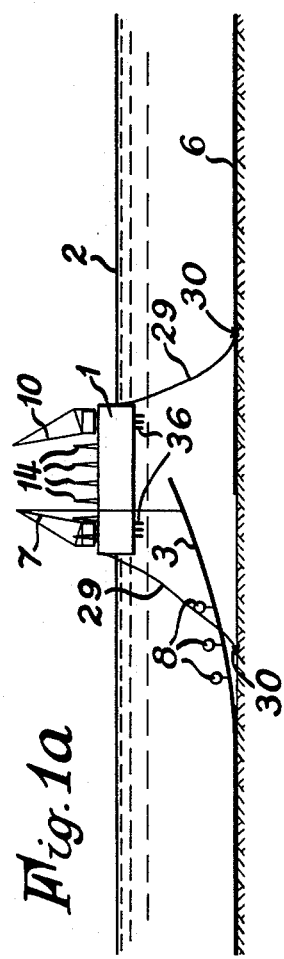
Figure 2A:
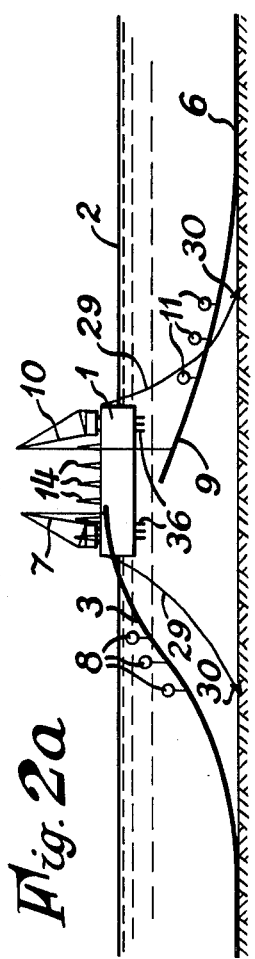
Figure 3A:
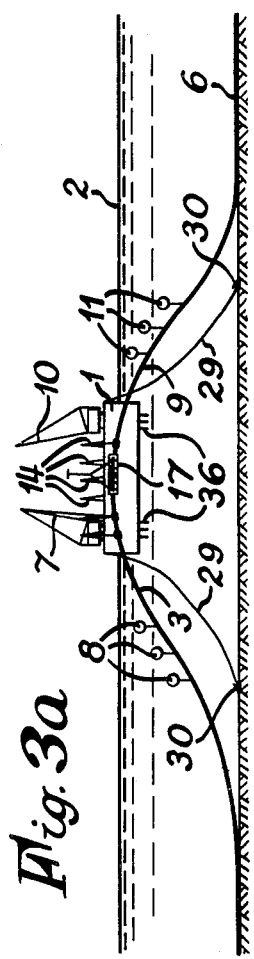
Figure 4B:
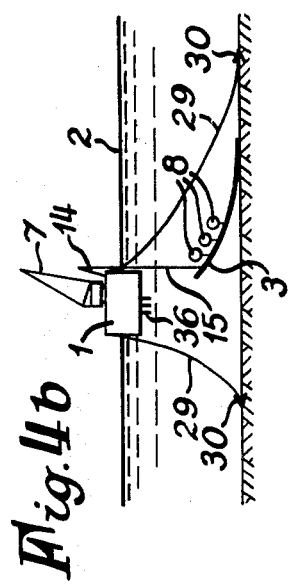
FIGS. 4a and 4b show the stage when the barge has moved laterally and the joined pipeline has been lowered about half way to the sea bed.
Figure 4A:
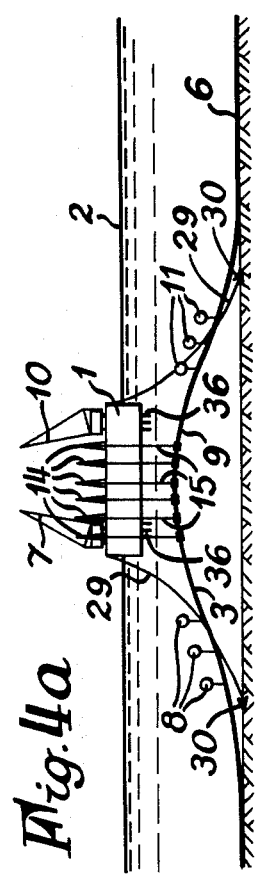
Figure 5:
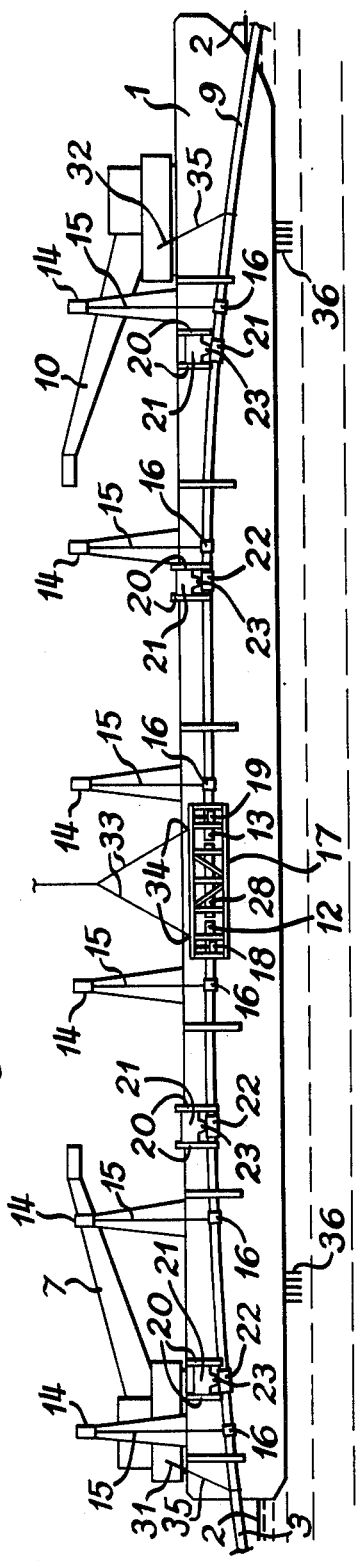
FIG. 5 is a side elevation of the barge and its associated apparatus.

The method is now described with reference to FIGS. 1 to 10.

Firstly a number of buoyancy tanks 8 shown schematically in the Figures each having a net lift of 10 tons are attached to one pipeline 3 at equally spaced intervals and the end 12 lifted to an anchored barge 1 floating on the sea 2 by the action of a crane 7 applying a substantially vertical force to the end 12 (the lifting is done without applying axial tension to the pipeline). The number, size and disposition of the buoyancy tanks 8 are chosen so that the lifting is possible without overstressing of the pipe and thus buckling and kinking are prevented. The length of pipeline 3 to which the tanks 8 are attached has a buoyancy of about neutral and the end 12 and portion adjacent thereto which is lifted by the cable from crane 7 has a negative buoyancy. After lifting, the end is held in a line-up frame 17 attached to the side of the barge and the end portion 9 of the other pipeline 6 is lifted in a similar manner using a crane 10, using the buoyancy obtained from tanks 11 which are of the same size and disposed similarly to buoyancy tanks 8.

When the ends 12 and 13 have been raised above the water surface, the pipelines 3 and 9 are then supported by six small cranes 14 disposed on the deck of the barge 1 using cables 15 and collars 16. The small cranes 14 then lift the pipelines 3 and 9 to brackets 22 which are located so that the ends 12 and 13 are presented horizontally end to end in the framework 17. Jaws 18 and 19 of the framework 17 then grip the pipelines 3 and 9. Brackets 22 are then placed over the pipelines 3 and 9. The brackets 22 are of an inverted U shape which can hinge at 23 on supports 21. The supports 21 can slide in guides 20. Afterwards the supports 21 are fixed to the side of the barge 1 by a locking mechanism (not shown). The cranes 14 then increase the tension in the cables 15, which acting through the collar 16, pull the pipelines 3 and 9 firmly up into the brackets 22. In this position the pipelines 3 and 9 are ready for joining.

The end caps (not shown) are then removed, the ends 12 and 13 bevelled and a spool piece 28 interposed between the ends and welded to form a continuous fluid tight length. Now that the pipelines have been joined the barge 1 cannot simply lower the pipeline vertically, since it would risk damage such as buckling or kinking. The barge 1 moves at right angles to the line of pipeline in a way so that small cranes 14 are on the trailing side of the barge 1 i.e. if the davits are on the port side, then the barge moves to starboard.

As the barge 1 moves it begins to lower the pipeline from the davits with the buoyancy tanks still attached. The pipelines 3 and 9 are lowered back into the sea supported by the buoyancy tanks 8 and 11 and by the cables 15 of the cranes 14 or by the cables 35 of the hauling lines 31 and 32. The cables 35 effect the lateral movement on the joined pipeline (see FIG. 4b), by means of winches, (not shown) on the barge to chains 29 and anchors 30 and/or by means of dynamic positioning by motors and propellers 36. When the centre of the pipe reaches the sea bed the tension in the davit cables falls to zero, whilst on either side of the centre a substantial length of pipe remains out of contact with the sea bed, supported by the buoyancy tanks, the highest point being about 10m above the sea bed. Then the buoyancy tanks are flooded over a period of 2-3 minutes and the pipeline sinks to the sea bed during this time.

FIG. 6 shows a bracket 22 with its support and a pivot 23 on which the bracket rotates and also one of the guides 20 on which the bracket support 21 slides vertically.

The line-up frame 17 is shown in FIG. 7. The line-up frame 17 is suspended by means of the cables 33 manoeuvred by a crane (not shown) and connected to attachments 35, on the ends 12 and 13 of the pipelines 3 and 9, and locked by means of jaws 18 and 19.

Figure 8:
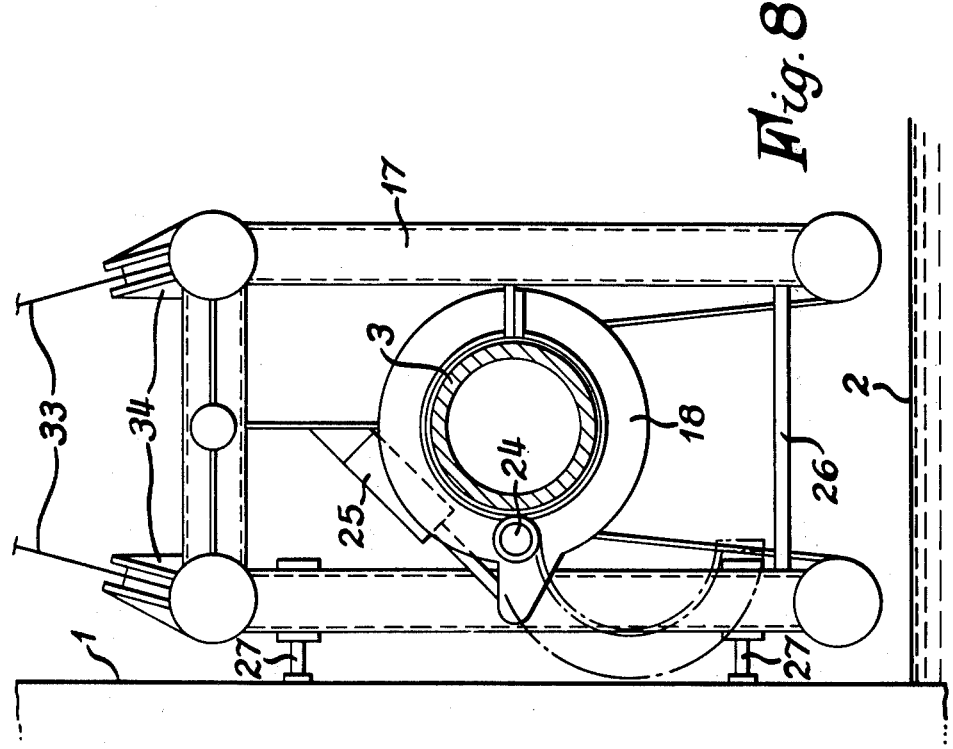
FIG. 8 is a front elevation section of the clamp.

In FIG. 8 the jaw 18 of the line-up frame 17 is illustrated in the locking position after having been rotated on the pivot 24 driven by the hydraulic piston 25. The figure also shows at 26 the grating gangway for the work of the labour force and 27 shows the supports of the line-up 17 on the side of the floating vessel 1.

Figure 9:
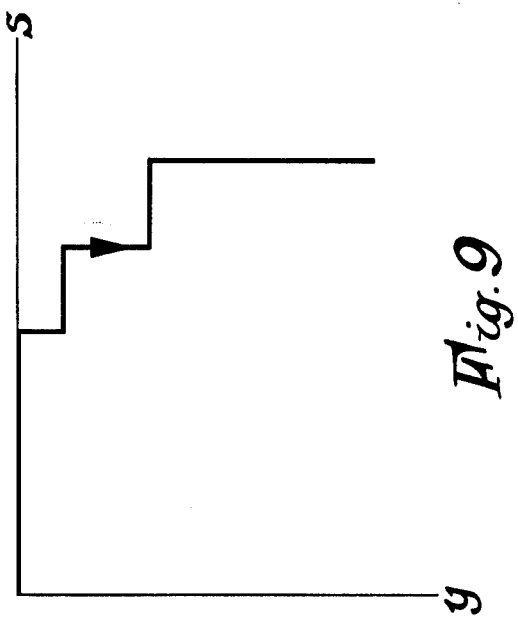
FIG. 9 is a diagrammatic view of the sideways movement of the barge and the lowering of the pipeline.

In FIG. 9 there is shown the graph of the depths y of sea reached by the highest part of the welding piping, plotted against the lateral displacements of the floating vessel. The graph shows the stepwise operation of the cranes 14 or the hauling lines 31 and 32.

FIG. 10 illustrates an alternative method of joining pipes 41 and 42 in which the unsupported length of pipeline not in contact with the sea bed is greatly reduced. It will be observed that instead of having two bends in the length of pipeline not in contact with the sea bed (i.e. a sag bed and overbend) as is the case when the pipeline is lifted so that its free end is horizontal, the pipeline has only one bend and the length not in contact with the sea bed is greatly reduced. This has the advantage of reducing the forces required to handle the pipeline. Both of the pipelines 41 and 42 are lifted using buoyancy tanks (not shown) in a manner such that their axes at the lifted ends are vertical to a barge 44 and a U shaped spool piece 43 welded in. The welded pipe is then lowered back to the sea bed in a manner as described above.

I claim:

1. A method of joining together the ends of two pipelines having an internal diameter of from about 10 to about 60 inches into a continuous length at an offshore location wherein at the commencement of the method at least one of the pipeline ends is submerged in water from about 100 to about 1000 feet in depth, the method comprising:
   a. dewatering the submerged pipeline or pipelines over the length to be lifted;
   b. initially lifting the submerged end or ends above the surface of the water with at least one first lifting means;
   c. positioning buoyancy means along the submerged pipeline or pipelines adjacent the end or ends to be lifted to assist said initial lifting;
   d. gripping the ends of said pipelines to maintain them in axial alignment;
   e. lifting the thus aligned pipelines into engagement with a plurality of longitudinally spaced-apart supporting structures with a plurality of longitudinally spaced-apart second lifting means, said supporting structures being lockably movable along the vertical plane and pivotal along the horizontal plane and being positioned so that the pipeline ends are presented horizontally end to end in axial alignment for joining;
   f. interposing a spool piece between the horizontal, axially aligned ends of said pipelines and welding said spool piece to said ends to form a continuous fluid tight length; and
   g. lowering and laterally moving said continuous length of pipeline back to the sea bed to form a loop in a horizontal plane on the sea bed.

2. A method as claimed in claim 1 wherein the gripping in step (d) is effected by means of a plurality of releasable collar like clamps.

3. A method according to claim 1 wherein at the beginning of the joining procedure the two pipelines are submerged underwater and are in overlapping relationship so that the pipeline ends can be axially aligned above the surface of the water.

4. A method as claimed in claim 1 wherein the buoyancy means comprises a plurality of buoyancy tanks attached to the pipeline at intervals along the length to be lifted.

5. A method as claimed in claim 4 wherein the number, size and disposition of the buoyancy tanks are such that the length of pipeline to which they are attached has a buoyancy of about neutral and the next adjacent portion has negative buoyancy.

6. A method as claimed in claim 1 wherein the lowering of the pipeline and the laterally moving are effected alternately.

7. A method as claimed in claim 1 wherein the lowering of the pipeline and the laterally moving are effected simultaneously.

8. A method as claimed in claim 1 wherein:-
   i. the lowering of the pipeline is carried out until the centre of the pipeline reaches the water bottom and the two portions on either side of the centre are supported only by the buoyancy means, and
   ii. flooding or removing the buoyancy means so that the two portions of pipeline settle onto the water bottom.

9. A method as claimed in claim 1 wherein the ends of the pipelines are lifted above the surface and up into a plurality of inverted U or the like shaped brackets attached to the side of a vessel to bring the pipeline ends into axial alignment.

10. A method as claimed in claim 9 wherein the ends of the pipelines are initially lifted by means of relatively large cranes and when the ends have been lifted above the surface the pipeline ends are pulled up into the inverted U or the like shaped brackets by means of a plurality of relatively small cranes spaced at intervals along the vessel.

* * * * *

UNITED STATES PATENT AND TRADEMARK OFFICE
CERTIFICATE OF CORRECTION

PATENT NO. : 4,051,687
DATED : October 4, 1977
INVENTOR(S) : John William Ells

It is certified that error appears in the above-identified patent and that said Letters Patent are hereby corrected as shown below:

Title page, in "[73]" after "London, England" add -- and Saipem S.p.A., Milano, Italy -- .
Col. 6, lines 1 and 2, delete "d. gripping the ends of said pipelines to maintain them in axial alignment;"
Col. 6, line 3, delete "e." and insert -- d. further -- in place thereof.
Col. 6, line 3, delete "thus aligned".
Col. 6, line 4, delete "sup-".
Col. 6, line 5, delete "porting structures" and insert -- inverted U shaped brackets -- in place thereof.
Col. 6, line 6, delete "supporting".
Col. 6, line 7, delete "structures" and insert -- inverted U shaped brackets -- in place thereof.
Col. 6, after line 11 and before line 12 add -- e. gripping the ends of said pipelines to maintain them in axial alignment; -- .
Col. 6, line 20, change "(d)" to -- e. -- .

Signed and Sealed this

Twenty-third Day of May 1978

[SEAL]

Attest:

RUTH C. MASON
Attesting Officer

LUTRELLE F. PARKER
Acting Commissioner of Patents and Trademarks